(12) United States Patent
Horstmann

(10) Patent No.: US 7,975,947 B2
(45) Date of Patent: Jul. 12, 2011

(54) FOOD CHOPPER

(75) Inventor: Klaus Horstmann, Neuenkirchen (DE)

(73) Assignee: EMSA GmbH, Emsdetten (DE)

( * ) Notice: Subject to any disclaimer, the term of this patent is extended or adjusted under 35 U.S.C. 154(b) by 30 days.

(21) Appl. No.: 12/616,265

(22) Filed: Nov. 11, 2009

(65) Prior Publication Data

US 2011/0108649 A1    May 12, 2011

(51) Int. Cl.
*A47J 43/25* (2006.01)

(52) U.S. Cl. ......................................................... 241/169

(58) Field of Classification Search .................. 241/168, 241/169
See application file for complete search history.

(56) References Cited

U.S. PATENT DOCUMENTS

| | | | | |
|---|---|---|---|---|
| 3,587,692 A * | 6/1971 | Nelson | ........................... | 241/270 |
| 3,933,315 A * | 1/1976 | Popeil | ........................... | 241/166 |
| 4,967,970 A * | 11/1990 | Michel | ........................... | 241/169 |
| 6,467,711 B2 * | 10/2002 | Michel | ........................... | 241/169 |
| 6,585,179 B2 * | 7/2003 | Weibel et al. | ................. | 241/169 |
| 7,100,854 B2 * | 9/2006 | Aby-Eva et al. | .............. | 241/169 |
| 7,152,821 B2 * | 12/2006 | Aby-Eva et al. | .............. | 241/169 |
| 7,258,292 B2 * | 8/2007 | Cheung | ........................... | 241/169 |
| 7,311,280 B2 * | 12/2007 | Herren | ........................... | 241/169 |
| 2001/0028007 A1 * | 10/2001 | Michel | ........................... | 241/169 |

FOREIGN PATENT DOCUMENTS

| | | |
|---|---|---|
| CH | 272 785 | 4/1951 |
| DE | 26 51 569 A1 | 11/1976 |
| DE | 203 03 809 U1 | 3/2003 |
| DE | 103 28 703 B3 | 6/2003 |
| DE | 20 2006 016 198 U1 | 10/2006 |
| EP | 0 732 075 A1 | 5/1995 |

* cited by examiner

*Primary Examiner* — Faye Francis
(74) *Attorney, Agent, or Firm* — Karl F. Milde, Jr.; Eckert Seamans Cherin & Mellott, LLC

(57) ABSTRACT

A food chopper has a two-part housing, with an upper housing section and a lower housing section, with a receiving chamber in which the goods to be cut can be positioned. At least one knife element is arranged to move axially within the housing with at least one knife edge moved into the receiving chamber. The housing is closed at its lower housing section with a receiving chamber. The knife element is connected to an inertia mass element.

9 Claims, 3 Drawing Sheets

FOOD CHOPPER

BACKGROUND OF THE INVENTION

The invention relates to a food chopper with an at least two-part housing with an upper housing section and a lower housing section with a receiving chamber in which the goods to be cut can be positioned, and with at least one knife element that can move axially within the housing and that can be moved with at least one knife edge into the receiving chamber.

Known from DE 20 2006 016 198 U1 is a dicing device for food with a low design height offering the advantage that the knife block makes a rotation after cutting such that different cutting lines occur for every cutting procedure. However, this cutting device is only of limited usefulness when cutting small goods such as cloves of garlic or smaller onions, because the distance between the knives is too big. Resulting in that the small goods to be cut enter the space between the two knives where it is only moved around but no longer cut into smaller pieces. Reducing the diameter of the known cutting device would reverse the diameter/height ratio. A cutting device with such a slender design would then require holding it with one hand to avoid tilting to the side while operating the cutting device with the other hand.

SUMMARY OF THE INVENTION

It is the objective of the invention to provide a food chopper for garlic or also for vegetable pieces, e.g., scallions that allows for quick and simple chopping.

This objective is achieved with a food chopper of the aforementioned kind in that the housing at its lower housing section is closed using a receiving chamber and in that the knife element is connected to an inertia mass element such that the mass inertia of the inertia element is utilized in an advantageous manner for chopping or cutting.

The inertia mass element, which preferably is made of a solid, food-safe metal piece, allows for the chopping of food simply by shaking the food chopper back and forth. If the knife unit, consisting of knife elements and the inertia mass element, is moved to the cutting chamber, which is closed at the end, then the fly wheel mass element accelerates and thus exerts a great impulse on the goods to be cut due to kinetic energy obtained in this manner, such that the blades can easily pierce the goods to be cut. In the opposite direction, the inertia mass element has the effect that the lodged blades are torn out of the goods to be cut.

Although the invention is particularly advantageous for chopping garlic due to the closed design, it shall be emphasized that the invention is a dicing device that is suitable for dicing food pieces of all kinds.

To bring the knife element to a defined starting position, preferably a compression spring is provided that lifts the knife unit sufficiently for the cutting chamber to be freely exposed.

In particular, the compression spring is retained in the upper housing section such that the lower housing section can be removed to supply it with the goods to be cut, regardless of the positioning of the knife unit.

It is particularly advantageous to guide the knife element in a rotatable slider element that is retained axially in the housing. The axially movable knife blades glide in the guide recesses in the slider element and are supported in this manner in order to prevent bending to the side during cutting. In the reverse direction of movement, the goods to be cut are held back by the slider element and remain thus in the receiving chamber in the lower housing section.

Advantageous is a design of the knife element with six or eight blades arranged in a star shape.

Preferably, the slider element is retained in a form-fitting manner between the upper and the lower housing section. In this manner the housing sections which can be screwed together enclose the slider element between them and easily release it when the housing is opened such that it can be removed and cleaned.

It is furthermore advantageous if it least one longitudinal hole is provided in the knife element with the length of said longitudinal hole corresponding to at least the axial travel. A cross bolt defined in the upper housing section passes through the longitudinal hole and secures the knife unit from dropping out of the upper housing section when the lower housing section is removed. In case of a design with a compression spring, the form-fitting coupling of the upper housing section and the knife unit also prevents the slider element from being expelled by the compression spring when disassembling the housing.

According to one preferred embodiment, it is additionally provided that the slider element is rotatably secured in the housing and that the upper housing section is provided with flights of thread. An all-around guide edge is then provided on the outside at the knife element or at the inertia mass element. The flights of thread are designed in their cross-section such that they are chamfered in the cutting direction, that is, that a guiding edge glides beyond it. During the upward movement, the guiding edge moves underneath the stop angle of the protruding flight of thread that is designed helically. The following gliding of the guiding edge along the flight of thread therefore forces a rotational movement of the knife unit. This results in the knife unit rotating by a certain rotational angle in relation to the previous cutting procedure during the subsequent cutting procedure, thus optimizing the dicing effect.

Preferably, the guiding edge can be designed as a spring element that protrudes sideways from the knife element. The spring design facilitates in particular the gliding process in the cutting device and also the engagement of the edge with the flights of thread during the upward movement.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
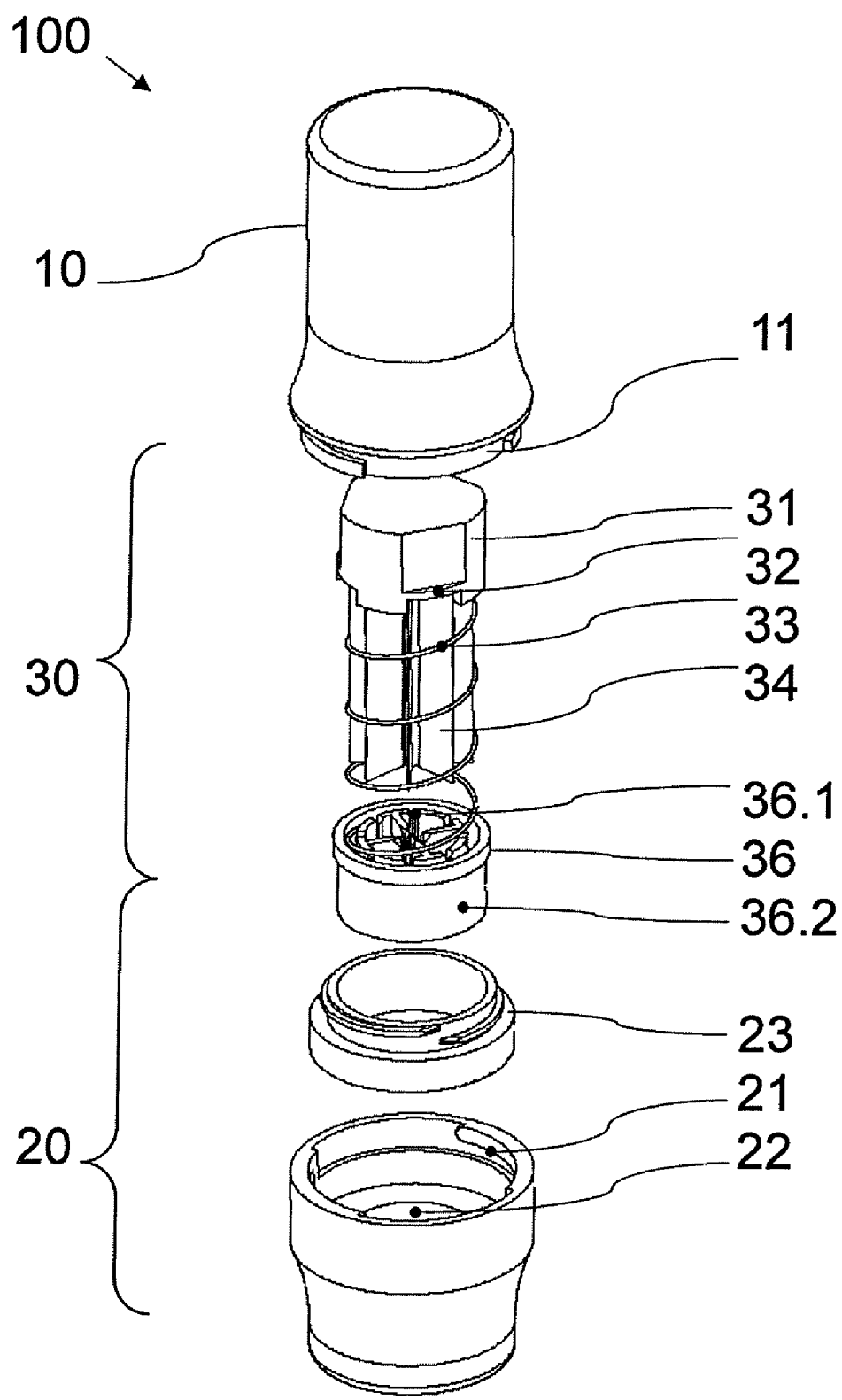
FIG. 1 shows an exploded view of a food chopper according to the present invention.

The preferred embodiments of the present invention will now be described with reference to FIGS. 1-3 of the drawings. Identical elements in the various figures are designated with the same reference numerals.

The food chopper 100 shown in FIG. 1 consists essentially of an upper housing section 10, a lower housing section 20 and a knife unit 30.

At its open end, the upper housing section 10 expands and is provided with a locking element 11, designed in the exemplary embodiment shown as a catch element to form a bayonet joint.

The lower section 20 with a chamber 22 for the cut goods has also connection elements 21 molded to its upper edge, here again to form a bayonet joint.

An interim ring 23 serves the purpose of partially covering the cutting chamber 22 towards the top. In particular, the inner cylindrical bore hole of the interim ring provides a gliding surface for receiving a slider element 36.

The slider element 36 exhibits a perfectly cylindrical outer surface 36.2 that is rotatably supported in the recess of the interim ring 23. Furthermore, in the axial direction the slider element 36 is interspersed with several guide recesses 36.1 for guiding knife elements 34. The knife elements 34 are affixed to an inertia mass element 31. A compression spring 33 is provided in order to lift off the unit consisting of knife elements 34 and inertia mass element 31 from the slider guide element 36 and return it to its starting position, where the inertia element 31 and the cutting element 34 are arranged in the upper housing section 10.

Figure 2:
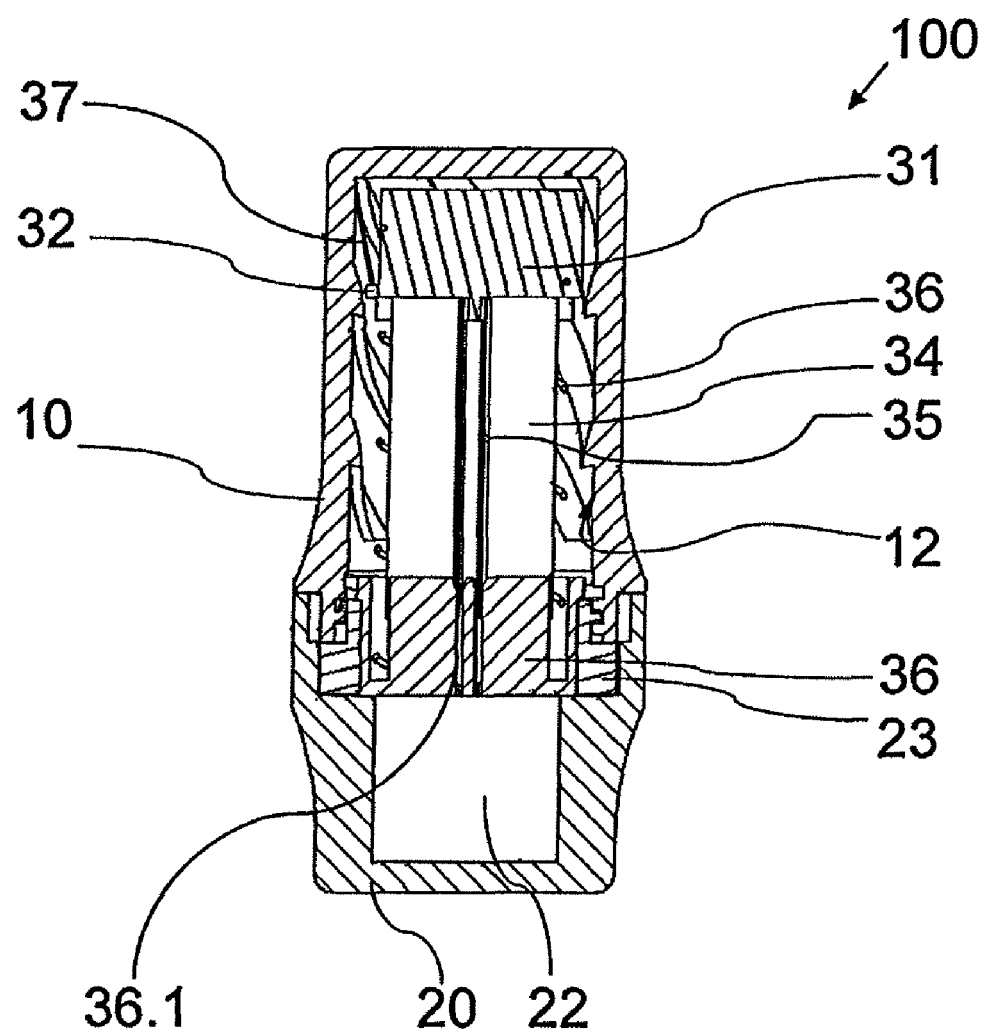
FIG. 2 shows a section of the food chopper of FIG. 1.

FIG. 2 is a sectional view of the operational food chopper 100. The upper housing section 10 is connected to the lower housing section 20 by enclosing the interim ring 23. The interim ring 23 is thereby retained in a form-fitting manner. In its inner section, it receives the slider element 36 and the knife elements 34, in turn, are guided in its guide recesses 36.1 in an axial direction movable fashion.

FIG. 2 shows the starting position in which the inertia mass element 31 is located at the very top in the upper housing section 10 and correspondingly the knife elements 34 do not yet protrude from the slider element 36. The knife elements 34 are provided with a longitudinal hole 35 for a cross bolt which secures the knife unit.

The design of the mover thread is particularly visible in the sectional presentation. Flights of thread 12 are molded to the inner section of the upper housing section 10 and are chamfered in the cutting direction, i.e., from top to bottom in FIG. 2. One guiding edge 32, or the spring element 37 arranged there, respectively, slides down the flights of thread during the top to bottom movement.

The inertia element can be guided with a play in the upper housing section 10, i.e., it can also have a slight tumbling movement. Thus, in the reverse direction, the at least one guiding edge 32 can move under the protruding stop edge of the flights of thread 12. During the subsequent gliding along the guiding edge 32, a rotational movement of the entire unit, consisting of inertia mass element 31, knife elements 34 and slider guide element 36, is effected.

Figure 3:
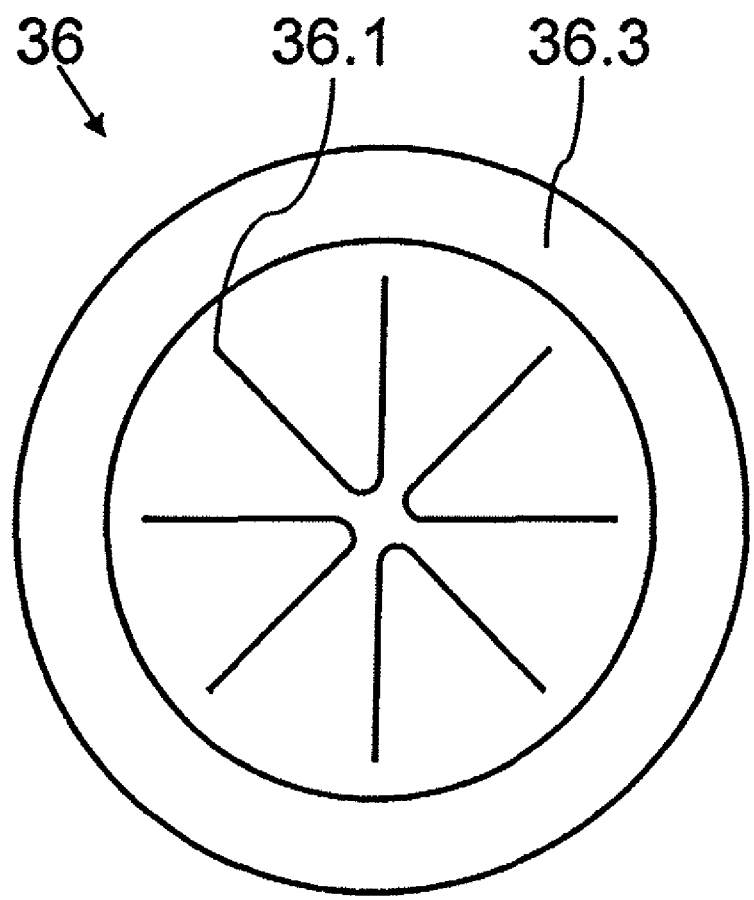
FIG. 3 shows a top view of a slider element in the food chopper of FIG. 1.

FIG. 3 shows in a top view of a slider guide element 36 in particular the V-shaped design of the knife elements 34, of which in the presented exemplary embodiment a total of four are provided with 2 edges each. They have an excellent stability due to their V-shaped cross-section. The slider element 36 is supported at the interim ring 23 by a collar and is thus retained axially. The compression spring 33 prevents too big a bounce up of the slider element 36 along the knife element 34.

There has thus been shown and described a novel food chopper which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A food chopper with an at least two-part housing with an upper housing section and a lower housing section with a receiving chamber in which the goods to be cut can be positioned, and with at least one knife element that can move axially within the housing and that can be moved with at least one knife edge into the receiving chamber; wherein the housing is closed at its lower housing section with the receiving chamber; wherein the knife element is connected to an inertia mass element; wherein the upper housing section is provided with flights of thread that are chamfered in the cutting direction and exhibit a stop edge in the return direction, and wherein at least one of (1) the knife element and (2) the inertia mass element are provided with at least one of (a) a protruding guide spring element and (b) a guide edge for engaging in the flights of thread at least across a portion of their outer circumference.

2. A food chopper as set forth in claim 1, further comprising a compression spring for moving the knife element back to a starting position.

3. A food chopper as set forth in claim 1, wherein the knife element is guided in a guide recess of a movable slider element that is retained axially in the housing.

4. A food chopper as set forth in claim 3, wherein the knife element is star-shaped and wherein the guide recess is arranged in a star-shaped fashion.

5. A food chopper as set forth in claim 3, wherein the slider element is retained in a form-fitting manner via a collar between a lower housing section and an upper housing section.

6. A food chopper as set forth in claim 3, wherein the slider element is rotatably supported in the housing.

7. A food chopper as set forth in claim 1, further comprising a spring element protruding sideways from the knife element for engaging in the flights of thread.

8. A food chopper as set forth in claim 1, further comprising a spring element protruding sideways from the inertia mass element for engaging in the flights of thread.

9. A food chopper as set forth in claim 1, wherein at least one longitudinal hole provided in the knife element for guiding a cross bolt disposed in an upper housing section.

* * * * *